US008411966B2

(12) United States Patent
Zhang et al.

(10) Patent No.: US 8,411,966 B2
(45) Date of Patent: Apr. 2, 2013

(54) ESTIMATION OF IMAGE RELATIONS FROM POINT CORRESPONDENCES BETWEEN IMAGES

(75) Inventors: Liang Zhang, Ottawa (CA); Demin Wang, Ottawa (CA); Houman Rastgar, Thornhill (CA); André Vincent, Gatineau (CA)

(73) Assignee: Her Majesty the Queen in Right of Canada, as represented by the Minister of Industry, through the Communications Research Centre Canada, Ottawa (CA)

( * ) Notice: Subject to any disclaimer, the term of this patent is extended or adjusted under 35 U.S.C. 154(b) by 706 days.

(21) Appl. No.: 12/633,463

(22) Filed: Dec. 8, 2009

(65) Prior Publication Data

US 2010/0232709 A1    Sep. 16, 2010

Related U.S. Application Data

(60) Provisional application No. 61/158,779, filed on Mar. 10, 2009.

(51) Int. Cl.
  *G06K 9/46* (2006.01)
  *G06K 9/32* (2006.01)
(52) U.S. Cl. .................................... 382/201; 382/294
(58) Field of Classification Search .................. 382/201
  See application file for complete search history.

(56) References Cited

U.S. PATENT DOCUMENTS

| | | | |
|---|---|---|---|
| 5,416,851 A | 5/1995 | Huttenlocher et al. ....... | 382/196 |
| 6,263,088 B1 | 7/2001 | Crabtree et al. ............. | 382/103 |
| 6,504,569 B1 | 1/2003 | Jasinschi et al. ............ | 348/43 |
| 6,546,120 B1 | 4/2003 | Etoh et al. .................... | 382/107 |
| 6,741,757 B1* | 5/2004 | Torr et al. ..................... | 382/294 |
| 6,834,120 B1 | 12/2004 | LeClerc et al. ............... | 382/170 |
| 6,879,711 B2 | 4/2005 | Maurincomme et al. ..... | 382/128 |
| 6,963,662 B1 | 11/2005 | LeClerc et al. ............... | 382/154 |
| 7,319,479 B1 | 1/2008 | Crabtree et al. ............. | 348/169 |
| 7,359,526 B2 | 4/2008 | Nister .......................... | 382/100 |
| 2006/0217925 A1* | 9/2006 | Taron et al. .................. | 702/179 |
| 2006/0280334 A1* | 12/2006 | Rav-Acha ..................... | 382/103 |
| 2009/0232388 A1 | 9/2009 | Minear et al. ................ | 382/154 |
| 2009/0310867 A1* | 12/2009 | Matei et al. .................. | 382/195 |

OTHER PUBLICATIONS

Fischler et al., "Random sample consensus: A paradigm for model fitting with applications to image analysis and automated cartography", Comm. of the ACM, vol. 24, pp. 381-395, 1981.

Torr et al., "The development and comparison of robust methods for estimating the fundamental matrix", Int. J. Computer Vision, 24(3): 271-300, 1997.

Torr et al., "Robust computation and parameterization of multiple view relations", Proc. Int'l Conf. Computer Vision (ICCV '98), pp. 727-732, Bombay, India, Jan. 1998.

(Continued)

*Primary Examiner* — David Zarka
(74) *Attorney, Agent, or Firm* — Teitelbaum & MacLean; Neil Teitelbaum; Doug MacLean

(57) ABSTRACT

The invention relates to a method for estimating an image relation model for two or more related images based on a plurality of point correspondences. The method includes using a weighted random sampling algorithm to repeatedly draw subsets of point correspondences for generating model estimates, evaluating said model estimates for the full plurality of the point correspondences, and updating weights associated with each of the point correspondences in the random sampling algorithm based on information obtained in said evaluating.

20 Claims, 9 Drawing Sheets

OTHER PUBLICATIONS

Torr et al., "MLESAC: A new robust estimator with application to estimating image geometry," Computer Vision and Image Understanding, vol. 78, No. 1, pp. 138-156, 2000.

Tordoff et al., "Guided-MLESAC: Faster image transform estimation by using matching priors", IEEE Trans. on Pattern Analysis and Machine Intelligence, vol. 27, No. 10, pp. 1523-1535, 2005.

Pylvänäinen et al., "Hill climbing algorithm for random sample consensus methods", ISVC 2007, Part I. LNCS, vol. 4841, pp. 672-681, Springer, Heidelberg (2007).

Fan et al., "Robust Scale Estimation from Ensemble Inlier Sets for Random Sample Consensus Methods", in ECCV 2008, Part III, LNCS 5304, pp. 182-195, 2008.

Rastgar et al., "Validation of Correspondences in MLESAC Robust Estimation", ICPR 2008.

Zhang et al., "Maximum Likelihood Estimation Sample Consensus with Validation of Individual Correspondences", $5^{th}$ International Symposium on Visual Computing, Las Vegas, Nevada, USA, pp. 447-456, Nov. 30-Dec. 2, 2009.

* cited by examiner

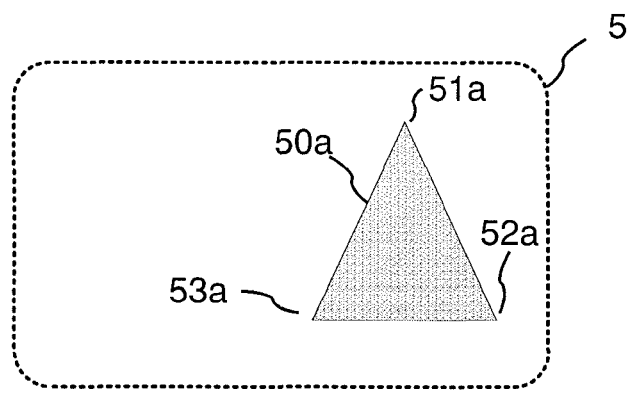
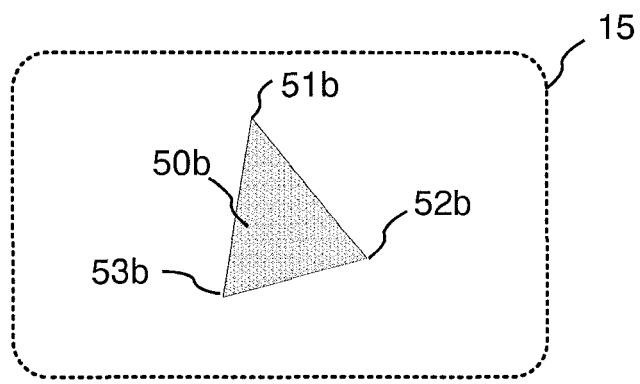
FIG. 2 (PRIOR ART)

*LLN-RANSAC algorithm*

1: Initiate each value of $w(i)$ to 0.5.
2: for $j=1$ to $I_{max}$ samples do
3:    Select minimal set $S_f$ of $l$ correspondences using $P(v_i)$.
4:    Derive motion hypothesis $F$.
5:    for all correspondences $i$ do
6:        Find residual Sampson error $\varepsilon_i$.
7:    end for
8:    Determine the number of inliers based on eq. (11).
9:    if the current inlier number is the largest so far then
10:        Retain motion hypothesis $F$ and keep the inliers,
11:        for all correspondences $i$ do
12:            Compute cumulative confidence $S_m^i = C_1^i + C_2^i + \ldots + C_m^i$.
14            Set $K$ be equal to $0.15 \times I_{max}$
15:            if $j$ is larger than $K$ then
16:                Update PC weights $w(i)$ with validities $P_m(i) = (S_m^i)/m$;
17:            end if
18:        end for
19:        Find expected inlier fraction $r$ using (12a); adjust $I_{max}$ using (12b).
20:    end if
21: end for
22: Re-derive motion hypothesis $F$ from the saved plurality of inliers using normalized eight-point algorithm.

FIG. 7

ESTIMATION OF IMAGE RELATIONS FROM POINT CORRESPONDENCES BETWEEN IMAGES

CROSS-REFERENCE TO RELATED APPLICATIONS

The present invention claims priority from U.S. Provisional Patent Application No. 61/158,779, filed Mar. 10, 2009, entitled "Estimation of Image Relations From Point Correspondences Between images", which is incorporated herein by reference.

TECHNICAL FIELD

The present invention generally relates to digital image processing, and more particularly relates to a robust estimation of image relations for two or more images of a same scene using dynamic validation of point correspondences between images.

BACKGROUND OF THE INVENTION

Knowing image relations between two images of a same scene or object is important in many applications, including but not limited to computer vision, image rectification, video compression, virtual reality, augmented reality, and 3D-TV content generation. An image relation is understood as a description or representation of position changes, from either a temporal or viewpoint perspective, of object points in the image planes. In applications image relation is conveniently represented by an image relation model, also referred to as an (image) motion model, examples of which include fundamental matrix, homography matrix, essential matrix, and affine transform.

For example, in a computer vision application the task may be to generate a three-dimensional (3D) representation of an object or scene from a video sequence of 2D images, such as can be obtained from a hand-held camera or camcorder, for instance, wherein different 2D images are taken from different camera positions relative to the same object or scene. If the suitable-form image relations between different video frames are obtained, this information can then be used, for example, for building a 3D graphical model from the image sequence, or to compress the video sequence of images. Furthermore, estimating the motion of an object in an image sequence is useful in background/foreground segmentation and video compression, as well as many other applications.

In recent years, advanced computer vision systems have become available also in hand-held devices. Modern hand-held devices are provided with high resolution sensors, making it possible to take pictures of objects with enough accuracy to process the images with satisfying results.

One known method for determining the image relations between two images is based on image point correspondences acquired from the two images. Image feature points can be identified either manually, or automatically by a feature detector, as described for example in C. Harris and M. Stephens, "A combined corner and edge detector," In Proc. 4th Alvey Vision Conference, pages 147-151, 1988. Correspondences between feature points of two images can then be established either manually or automatically, for example by identifying similarities in the textures surrounding the feature points in the two images, such as by using a cross-correlation coefficient as a criterion. One example of a method for the determination of image relations between two images is disclosed in U.S. Pat. No. 7,359,526, which describes determining camera pose parameters from point correspondences, and which is incorporated herein by reference. U.S. Pat. No. 6,741,757, which is also incorporated herein by reference, discloses another exemplary method wherein correspondence between respective feature points of two images are established using an image pyramid.

Ideally, a relatively small number of known point correspondences can be used to reconstruct the image relation between two images. For example, an image taken from a hand-held device gives rise to rotations and perspective effects between consecutive images. In order to extract and interpret the desired information about the objects in the images, a projective transformation is needed. Such a projective transformation requires four different point correspondences where no three points are collinear. However, due to the noise introduced by image capturing and the errors originated from feature matching, different point correspondences may have different validity, and some may be mismatched and thus not be valid at all. Accordingly, having a technique for estimating the image relation model that is robust with respect to inaccurate and noisy data is essential to reduce negative effects of mismatched point correspondences, often referred to as outliers. Prior art robust estimation methods can be classified into one of three categories: the M-estimator, case deletion diagnostics, and random sampling consensus paradigm (RANSAC). The M-estimator, as described for example in R. A. Maronna, "Robust M-estimators of multi-variate location and scatter," Ann. Stat. Vol. 4, No. 1, pp. 51-67, 1976, follows maximum-likelihood formulations by deriving optimal weighting for the data under non-Gaussian noise conditions. Outliers have their weights reduced rather than being rejected completely. The estimators minimize the sum of the weighted errors. The case deletion diagnostics method, as described for example in S. Chaterjeem and A. S. Hadi, Sensitivity Analysis in Linear Regression, John Wiley, New York, March 1988, is based on influence measures. Small perturbations are introduced into parameters of the problem formulation and the consequent changes of the outcome of the analysis are assessed. Based on the assessment, the method of the case deletion diagnostics monitors the effect on the analysis of removing the outlier. RANSAC method, described in M. A. Fischler and R. C. Bolles, "Random sample consensus: a paradigm for model fitting with application to image analysis and automated cartography," Comm. of the ACM, Vol. 24, pp 381-395, 1981, which is incorporated herein by references, is a hypothesis and verification algorithm. It proceeds by repeatedly generating solutions estimated from minimal sets of correspondences gathered from the data and then testing each solution for support from the complete set of putative point correspondences to determine the consensus for the motion model to be estimated. A comparison study of these three strategies for robust estimation of image relations indicated advantages of the random sampling techniques of RANSAC, see P. H. S. Torr and D. W. Murry, "The development and comparison of robust methods for estimating the fundamental matrix," Int. J. Computer Vision, Vol. 24, No. 3, pp. 271-300, 1997.

The RANSAC approach employs a hypothesis scoring technique to evaluate each motion model hypothesis that is generated from a minimal set of putative point correspondences. The standard RANSAC algorithm counts the number of inliers for each generated motion model hypothesis by binarizing the errors with a given threshold. The MSAC (M-estimator sample consensus) estimator, described in P. H. S. Torr and A. Zisserman, "Robust computation and parameterization of multiple view relations," Proc. Int'l Conf. Computer Vision (ICCV '98), pp. 727-732, Bombay, India, Jan.

1998, which is incorporated herein by reference, measures the quality of this hypothesis in such a way that outliers are given a fixed penalty while inliers are scored on how well they fit the data. The MLESAC algorithm, described in P. H. S. Torr and A. Zisserman, "MLESAC: a new robust estimator with application to estimating image geometry," Computer Vision and Image Understanding, Vol. 78, No. 1, pp. 138-156, 2000, which is incorporated herein by reference, evaluates the likelihood of the model hypothesis instead of heuristic measures. It requires the estimation of a parameter representing the proportion of valid point correspondences and employs the expectation maximization (EM) algorithm. The aforementioned prior art methods assume equal constant validities of point correspondences. The Guided-MLESAC algorithm, disclosed in B. J. Tordoff and D. W. Murry, "Guided-MLESAC: fast image transform estimation by using matching priors," IEEE Trans. on Pattern Analysis and Machine Intelligence, Vol. 27, No. 10, pp. 1523-1535, 2005, which is incorporated herein by reference, extends the MLESAC algorithm by adding prior validity information for each individual point correspondence. The prior validities of point correspondences are however calculated only from the feature matcher and keep constant during estimating the parameters of the motion model. In the absence of meaningful matching scores the performance Guided-MLESAC is no better than that of the MLESAC algorithm.

In addition, several techniques have also been proposed to speed up the verification phase of the standard RANSAC algorithm. For instance, Matas and Chum in O. Chum and J. Matas, "Optimal Randomized RANSAC," IEEE Trans. on Pattern Analysis and Machine Intelligence, Vol. 30, No. 8, pp. 1472-1482, August 2008, designed a randomized sequential sampling evaluation to enable the early termination of the hypothesis evaluation of the RANSAC. An article by D. Nister, "Preemptive RANSAC for live structure and motion estimation," Proc. Int'l Conf. Computer Vision (ICCV '03), vol. 1, pp. 199-206, October 2003, presents a preemptive RANSAC method to efficiently select, with predefined confidence, the best hypothesis from the fixed number of generated hypotheses. Disadvantageously, if a good solution is not among the fixed number of the generated hypotheses that can be evaluated in the time available, the preemptive RANSAC method will fail to reach the correct hypothesis. In addition, the preemptive scoring is not very helpful in improving efficiency of the standard RANSAC when the scoring is computationally cheap compared to the hypothesis generation.

These prior art methods employing the random sampling consensus algorithm have at least the following two shortcomings. First, with respect to the conventional random sampling consensus method, a given sampling is independent from the previous samplings. No information from the previous samplings is analyzed and exploited. However, a single sampling can be viewed as a random event. The probability theory states that if an event is repeated many times the sequences of the random events will exhibit certain statistical patterns, which can be studied and predicted. In other words, the statistical patterns evolved in the previous samplings could be determined and should be further exploited to benefit the analysis of the subsequent sampling. Another shortcoming is that an outlier might not necessarily be an incorrect correspondence, but may simply disagree with the particular model that is to be estimated. The validity values for the point correspondences used in the aforementioned Guided-MLESAC approach are based on matching scores from a feature matcher and do not take into consideration the model hypothesis.

Recently, approaches have been suggested wherein the random sampling is adaptively guided by previous sampling results. For example, a so called hill climbing (HC) algorithm, disclosed in Pylvanainen, T., Fan, L.: "Hill climbing algorithm for random sampling consensus methods," ISVC 2007, Part I. LNCS, vol. 4841, pp. 672-681, Springer, Heidelberg (2007), which is incorporated herein by reference, attempts to improve upon the RANSAC method by utilizing guided sampling, wherein weights assigned to individual data points to guide the probability of their selection, are updated during the execution of the algorithm based on a currently best sample with the largest number of inliers. In this method, the probability of selecting an inlier to the current model in a next sampling step is increased proportional to the number of inliers for the current model. Since the number of inliers may be large, the HC algorithm may overly emphasize some data points over others based on the results for a single sample, and therefore may get stuck climbing a local maximum missing a true optimal solution.

Accordingly, it is an object of the present invention to improve upon the prior art by providing an efficient method for determining an image relation model for two images that is free from at least some of the disadvantages of the prior art.

It is a further object of the present invention to provide an efficient method for determining an image relation model for two images of a same scene or object by randomly sampling a plurality of point correspondences using a weighted random selection algorithm wherein weight parameters used in selecting individual point correspondences are dynamically updated to assist in the selection of subsequent samplings using information obtained in previous samples.

It is another object of the present invention is to provide a method for assessing the validity of individual point correspondences in the general framework of a RANSAC-like process for determining a motion model for two images.

SUMMARY OF THE INVENTION

In accordance with the invention, there is provided a method for determining an output image relation model relating two images of a same scene or object obtained from one or more cameras, in a system comprising a processor and a memory for storing a plurality of point correspondences (PCs) between the two images. The method comprises the following steps: a) using the processor to perform a series of PC sampling steps, each comprising: i) selecting a PC subset from the plurality of PCs utilizing a weighted random or pseudo-random selection algorithm wherein individual PCs are selected in dependence upon current values of weight parameters assigned thereto, ii) computing an image relation model estimate based on the PC subset, and iii) obtaining information related to an accuracy of the image relation model estimate for the plurality of PCs; b) obtaining, with the processor, the output image relation model using the information related to the accuracy of the computed image relation model estimates; and, c) saving the image relation model in a computer-readable memory for generating new images.

According to one aspect of the invention, the current values of the weight parameters assigned to the PCs remain generally constant in a first K PC sampling steps, wherein K is an integer greater than 1, while in at least one of the PC sampling steps following the first K PC sampling steps the current values of the weight parameters are updated by the processor using the image relation model estimate computed in said at least one of the PC sampling steps.

An aspect of the present invention relates to the method for determining an image relation model for the two images, which comprises using a processor to perform a series of PC sampling steps, each comprising: i) selecting a PC subset from the plurality of PCs utilizing a random or pseudo-random selection algorithm, wherein in at least some of the PC sampling steps individual PCs are selected from the plurality of PCs with a probability that depends on current values of weight parameters assigned to each of the PCs, ii) computing an image relation model estimate for said PC subset, iii) computing, for each of the plurality of PCs, a PC error value for the image relation model estimate generated in said PC sampling step, and generating a score value for said image relation model estimate based on said PC error values for the plurality of PCs, and iv) computing PC confidence values based on the PC error values of corresponding PCs. In this aspect of the invention, at least some of the PC sampling steps further comprise updating values of the weight parameters based on cumulative PC confidence values computed for a sequence of PC sampling steps. The method may further include obtaining, with the processor, the image relation model based on one of the image relation model estimates that has a best score value, and saving the image relation model in a computer-readable memory for generating new images.

Another aspect of the present invention provides a method for determining an output image relation model relating two images of a same scene or object obtained from one or more cameras in a system comprising a processor and a memory for storing a plurality of point correspondences (PCs) between the two images, which comprises: a) using the processor to perform a series of PC sampling steps, each comprising: i) selecting a PC subset from the plurality of PCs utilizing a weighted random or pseudo-random selection algorithm wherein individual PCs are selected in dependence upon current values of weight parameters assigned thereto, ii) computing a image relation model estimate based on the PC subset; iii) computing, for each of the plurality of PCs, a PC error value for the image relation model estimate generated in said PC sampling step; and, iv) generating a score value for said candidate motion model based on said PC error values for the plurality of PCs. In this aspect of the invention, at least one of the PC sampling steps comprises computing, by the processor, PC probability values based on the error values computed for corresponding PCs in a current PC sampling step and on a distribution of the error values computed for the plurality of PCs in the current PC sampling step, and updating by the processor the current values of the weight parameters using the PC probability values computed in said at least one of the PC sampling steps.

BRIEF DESCRIPTION OF THE DRAWINGS

The invention will be described in greater detail with reference to the accompanying drawings which represent preferred embodiments thereof, wherein:

FIG. 2 is a schematic diagram illustrating point correspondences for two images according to prior art;

FIG. 7 is a representation of the LLN-RANSAC algorithm of the present invention;

DETAILED DESCRIPTION

Figure 1:
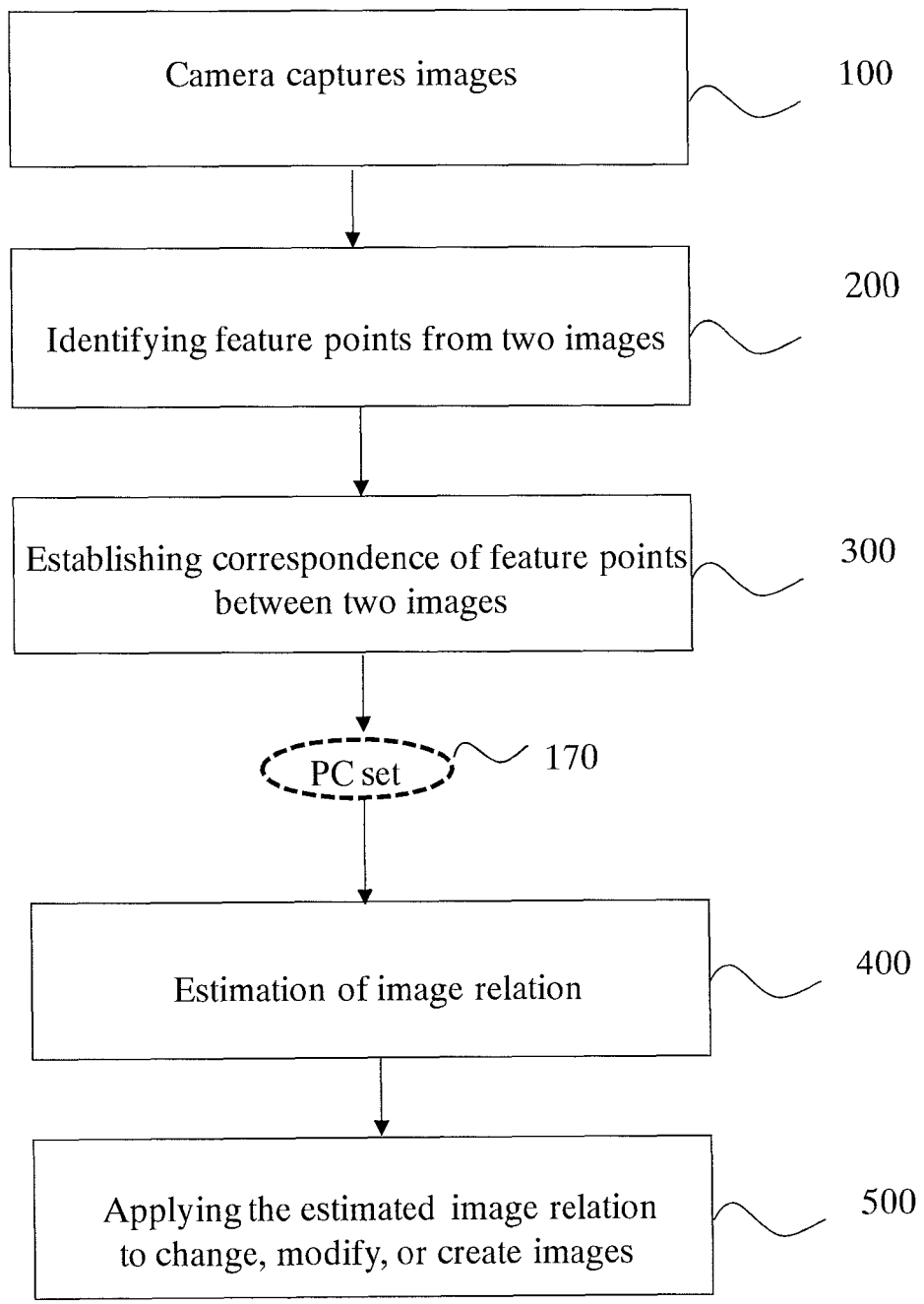
FIG. 1 is a schematic diagram of a prior art process in which a method for generating image relation models for two or more related images can be utilized.

The following is a partial list of abbreviated terms and their definitions used in the specification:
RANSAC Random Sampling Consensus
ASIC Application Specific Integrated Circuit
SNR Signal to Noise Ratio
DSP Digital Signal Processor
FPGA Field Programmable Gate Array
IRM Image Relation Model
IRME Image Relation Model Estimate
PC point correspondence
ML Maximum Likelihood
F fundamental matrix Unless specifically stated otherwise and/or as is apparent from the following discussions, terms such as "processing," "operating," "computing," "calculating," "determining," or the like, refer to the action and processes of a computer, data processing system, processor, logic circuit or similar processing device that manipulates and transforms data represented as physical, for example electronic, quantities.

In the following description, reference is made to the accompanying drawings which form a part thereof and which illustrate several embodiments of the present invention. It is understood that other embodiments may be utilized and structural and operational changes may be made without departing from the scope of the present invention. The drawings include flowcharts and block diagrams. The functions of the various elements shown in the drawings may be provided through the use of dedicated data processing hardware such as but not limited to dedicated logical circuits within a data processing device, as well as data processing hardware capable of executing software in association with appropriate software. When provided by a processor, the functions may be provided by a single dedicated processor, by a single shared processor, or by a plurality of individual processors, some of which may be shared. The term "processor" should not be construed to refer exclusively to hardware capable of executing software, and may implicitly include without limitation, logical hardware circuits dedicated for performing specified functions, digital signal processor ("DSP") hardware, application specific integrated circuits (ASICs), field-programmable gate arrays (FPGAs), read-only memory ("ROM") for storing software, random access memory ("RAM"), and non-volatile storage.

FIG. 1 illustrates an exemplary framework in which the method of the present invention can be advantageously used. In this framework, the task may be to change or modify a sequence of images in such a way that preserves relationships between individual images in the sequence, when the images are of a same scene or object taken by one or more video or photo cameras. In the process, new images may be created, for example with added, removed or modified objects; possible applications include adding or removing an object in a video sequence, or generating a 3D representation of the image wherein two or more 2D images relating to desired viewpoints are used. This can be done by performing the general steps shown in FIG. 1, wherein each rectangular block 100 to 500 represents a particular step or process. First, in step 100 two or more images of a same scene or object are captured using one or more cameras. Next, in step 200 a plurality of characteristic feature points in the two or more images are identified, for example manually or using known in the art feature finder algorithms. Next, in step 300 correspondences between the feature points of the two or more images are established, so as to relate each feature point in one of the images to a corresponding feature point in the other of the two images, and saved in memory in a suitable form to represent a plurality of point correspondences. For example, an individual point correspondence (PC) may be represented as a pair of pixel identifiers, each pixel identifier pointing to a pixel representing the feature point in a respective image.

By way of example, FIG. 2 schematically illustrates two images 5 and 15 wherein a same object, exemplified by a pyramid, is shown captured with different camera positions and orientations, and represented in the images 5, 15 by triangles 50a and 50b, respectively. Using known in the art methods, it can be established that the triangles 50a and 50b correspond to the same feature. If it is further established that corner points 51a and 51b are images of a same vertex of a pyramid 50, a point correspondence PC1=(51a, 51b) may then be formed. Similarly, point correspondences PC2=(52a, 52b), and PC3=(53a, 53b) maybe established, each corresponding to a different vertex of the pyramid. Here, the identifiers "51a" etc may represent, for example, pixel coordinates of a corresponding feature point in a respective image. In practice, a large number of point correspondences, for example hundreds, is typically generated for any two images for which an image relation model is to be determined.

Turning back to FIG. 1, step 300 provides a plurality of PCs 170, which is also referred to hereinafter as the full PC set 170, which is passed to a process 400 wherein it is used to generate an image relation model (IRM) for the two images that suitably fits the plurality of the PCs. The IRM generated by the process 400 should be robust with respect to errors in the received data 170, and account for the possibility of mismatched PCs and noise in the images, which may result in deviations of some of all of the respective feature points from their ideal positions. Advantageously, the present invention provides a robust and efficient implementation of the process 400 for obtaining the IRM from the plurality of the PCs 170, exemplary embodiments of which are described in detail hereinbelow.

The IRM generated by the process 400, which is also referred to herein as the IRM estimator, may be utilized in step 500 as desired, for example to create new images by changing or modifying the two original images 5 and 15, e.g. by adding new objects, by creating new images of the same scene with a different camera pose, etc as required in a particular application.

Figure 3:
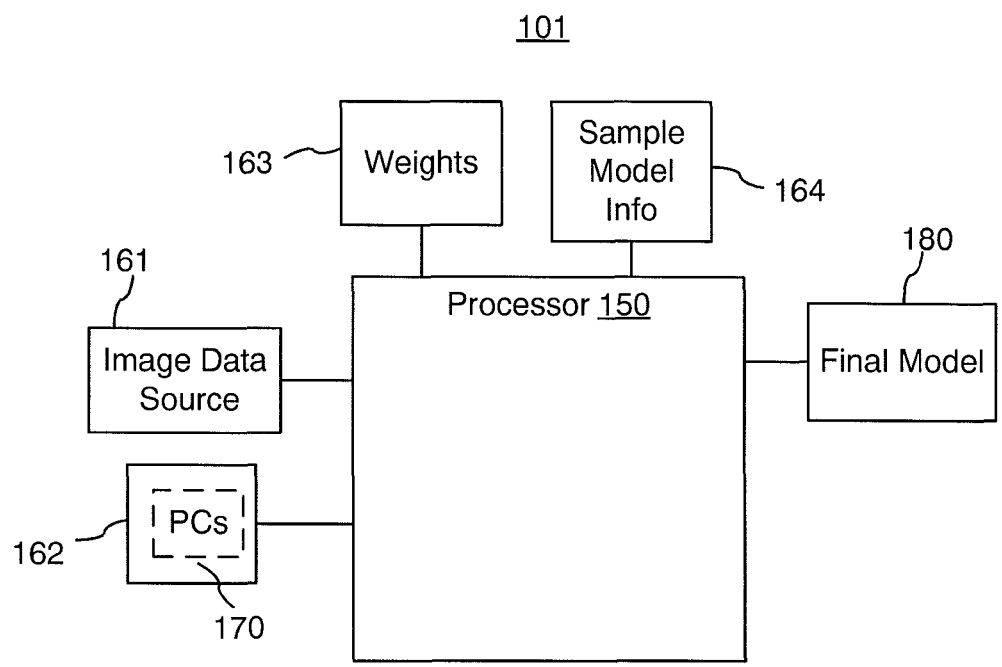
FIG. 3 is a schematic diagram of an exemplary computer system for implementing the method for generating image relation models of the present invention.

FIG. 3 illustrates a computer system 101 suitable for implementing the method of the present invention for determining an image relation model (IMR) from the plurality of point correspondences (PCs) between two images of a same scene or object. The computer system 101 includes a processor 150 and computer readable memory coupled thereto, the computer readable memory including an optional image memory 161 wherein the two images 5, 15 can be stored, PC memory 162 for storing the full PC set 170, a memory unit 180 for storing a final, or output, IMR and memory units 164, 163 for storing information related to successful sample models and PC weights computed therewith, as described in detail hereinbelow. In operation, the processor 150 executes a set of instructions for carrying out the method of the present invention.

Figure 4:
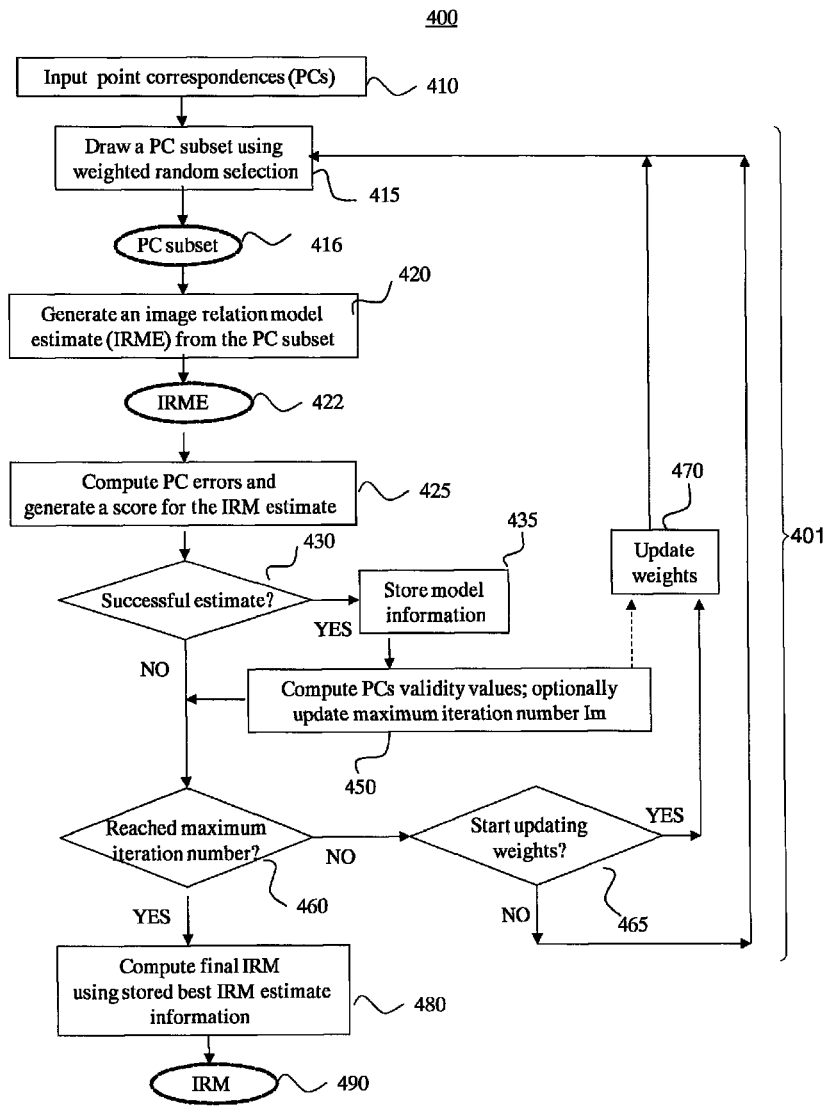
FIG. 4 is a schematic flowchart of the process for generating image relation models for two or more related images according to the present invention.

Exemplary embodiments of the method of the present invention will now be described with reference to FIG. 4 illustrating general steps of the method, and in relation to the computer system 101 of FIG. 3 implementing said system. The method is iterative and follows the general RAMSAC framework of random sampling the full PC set 170 to obtain a plurality of IRM estimates, and generating an output IRM based on an inlier set of a best of the estimates, and in addition involves dynamic real-time validation of the input point correspondences as the IRM estimates are being generated, with validity factors assigned to individual PCs in each of "successful" iterations being used in a subsequent iteration to guide a weighted random or pseudo-random sampling of the PCs.

The terms "successful iteration" or "successful sample" are used herein interchangeably to denote iterations of the method which produce IRM estimates having a score that is greater, or at least is not less, than the score of any previously generated IRM estimate. Similarly, the term "successful model" is used herein to mean an IRM estimate having a score that exceeds, or is at least not less than the score of any previously generated IRM estimate during the method execution.

With reference to FIG. 4, there is shown a flowchart of the method 400 of the present invention for generation an output IRM 490 from the full PC set 170 in one embodiment thereof. In a first step 410, the full PC set 170 is received, for example read by the processor 150 from the memory 162, which can be in the form of a permanent computer-readable memory such as a hard drive, optical drive, solid-state flash drive and the like. The processor 150 then executes a set of instructions for performing a series of iterations, which are also referred to as PC sampling steps 401, each of which including at least steps 415, 420, and 425, and being performed multiple times to obtain a suitably large number of sample models, i.e. the IRM estimates, from which a best model is selected and used in step 480 to provide the output IRM 490.

Each iteration, i.e. each PC sampling step 401, starts with step 415, wherein the processor executes a random or pseudo-random selection algorithm to draw from the full PC set 170 a PC subset $S_f(k)$ 416 of/point correspondences, wherein k=1, 2, ... $I_{max}$ is the iteration counter, with each PC having a predefined probability to be selected; this process will also be referred to herein as sampling, and the PC subset 416 referred to as a sample of the PCs, or simply as a sample, with each individual sampling being a random and independent event. In at least some of the PC sampling steps, the probability of selecting each particular PC is guided by a PC weight factor w(i) assigned thereto, wherein "i" indicates the corresponding PC. In the following, indices i and k refer to individual PCs and iterations, respectively, unless stated otherwise.

The random or pseudo-random selection algorithm executed by the processor 150 in each PC sampling step may be based for example on the well-known Monte-Carlo algorithm, and may select an $i^{th}$ PC with the probability defined by the weight factor w(i). If no a-priori information about individual PCs is provided as input to the method 400, in the initial sampling stage each of the PCs may be selected with a generally same probability. In other embodiments, the method may utilize differing weight factors w(i) in the selection of individual PCs already at the first iteration, which can be provided to the method 400 as input.

In step 420, the processor 150 utilizes the PC subset $S_f$ 416 to compute therefrom an image relation model estimate (IRME), which is also referred to herein as a sample IRM or a sample model. By way of example, in the following description each IRM or IRM estimate is assumed to be in the form of the fundamental matrix F, which represents the epipolar geometrical constraint between two images and is applicable for general motion and structure attributes with uncalibrated cameras. We denote the sets of feature points in the two images forming the plurality of PCs 170 as $\{\tilde{x}_i^j\}$, wherein i=1, . . . n and j=1, 2 refers to one of the two images, wherein n in the total number of the PCs. These image points are the image projections from an object, as viewed in the first and second image 5, 15. We further use the notation $\epsilon_i(F)$ to denote an error generated by a given IRM F when applied to the $i^{th}$ correspondence $\{\tilde{x}_i^1, \tilde{x}_i^2\}$, as defined by the following equation (1):

$$\tilde{x}_i^{2T} F \tilde{x}_i^1 = \epsilon_i(F). \tag{1}$$

When the two image points in an $i^{th}$ PC are perfectly matched, $\epsilon_i(F)=0$. There is a minimum number $l_{min}$ of PCs that have to be in a sample that is sufficient to define an IRM; for the fundamental matrix, $l_{min}$ is 7 PCs. A minimal subset is a subset of PCs that contains $l_{min}$, of PCs, i.e. just enough data to define a model. According to the present invention, the PC subsets $S_f$ may be minimal subsets, but may also be of a size 1 greater than the minimal $L_{min}$, but substantially smaller than the total number $N_{tot}$ of PCs in the full PC set 170 in some embodiments. Those skilled in the art will appreciate that the processor 150 may use any suitable algorithm for solving equation (1), resulting in a set of model parameters defining the fundamental matrix F.

By way of example, in one embodiment the fundamental matrix F may be determined using a maximum likelihood estimator (MLE) as known in the art, which obtains an IRM estimate F(k) so that $$F(k) = \max_F \left\{ \prod_{i=1}^n p(\epsilon_i | F) \right\}, \tag{2}$$

where $p(\epsilon_i|F)$ is a likelihood function that describes how well the $i^{th}$ correspondence $\{\tilde{x}_i^1, \tilde{x}_i^2\}$ is matched by an IRM F; see, for example, an article P. H. S. Torr and A. Zisserman, "Robust computation and parameterization of multiple view relations," ICCV, Bombay, India, (1998) 727-732, which is incorporated herein by reference. In another embodiment, the IRM estimate F(k) may be obtained by maximizing the number of inliers, in accordance with the standard RANSAC approach. In the following we will denote the sample IRM obtain in a $k^{th}$ PC sampling step as $F_k$, with the final, or output IRM obtained at the output of the method 400 denoted $F_{out}$.

In step 425 the processor 150 obtains information related to an accuracy of the image relation model estimate for the plurality of PCs 170; it verifies the sample model $F_k$ generated in step 420 of the current iteration by applying said sample model to the full PC set 170, and obtains, for each of the said PCa, the PC error value $\epsilon_i(F_k)$ for the image relation model estimate $F_k$; based on these PC error values, the processor 150 further generates a score value E(k) for said image relation model estimate $F_k$, so that the higher the score value, the generally better is the plurality of the PCs 170 matched by the current sample model.

In one embodiment, in accordance with the standard RANSAC approach, step 425 includes classifying each of the PCs into one of two subgroups: inliers and outliers, depending on whether the error value $\epsilon_i(F_k)$ of the corresponding $i^{th}$ PC is less or greater than a threshold value $T_{thr}$, according to a rule:

$$\text{the } i^{th} \text{ PC is} \begin{cases} \text{an inlier, if } \|\epsilon_i(F_k)\| < T_{thr} \\ \text{an outlier, if } \|\epsilon_i(F_k)\| \geq T_{thr} \end{cases}$$

In one embodiment, the score value may be computed as the total number I(k) of the inliers obtained for a particular sample model when applied to the full PC set 170, $$E(k)=I(k), \tag{3}$$

or a fraction r of inliers in the total number of the PCs in the full PC set 170, i.e. using E(k)=I(k)/n.

In another embodiment, the score value can be generated by estimating a probability that the current sample model is a correct one given the PC errors, for example in accordance with the following equation (3a):

$$E(k) = \prod_{i=1}^n \left( \left[ \frac{1}{\sqrt{2\pi\sigma^2}} e^{\frac{-\|\epsilon_i(F_k)\|^2}{2\sigma^2}} \right] P(v_i) + \frac{1}{w}(1 - P(v_i)) \right) \tag{3a}$$

where σ is the standard deviation of the PC errors for the inliers and w is the range of the uniform distribution of errors generated by the outliers, and $P(v_i)$ is the probability of the i-th PC being an inlier; see also B. J. Tordoff and D. W. Murry, "Guided-MLESAC: fast image transform estimation by using matching priors," IEEE Trans. on Pattern Analysis and Machine Intelligence, Vol. 27, No. 10, pp. 1523-1535, 2005, which is incorporated herein by reference.

Next, the processing may proceed to step 430, wherein the processor 150 determines if the current score value E(k) is at least as large as a maximum score $E_m$ obtained so far in any of the previous (k−1) PC sampling steps, and if E(k)≧$E_m$, it assigns $E_m$=E(k), and stores the current maximum score value $E_m$ in memory 164 in step 435. Optionally, step 435 may include storing other model-related information for the current successful model, such as a list of all inliers as identified for the current successful model. The PC error values are then used in step 450 to compute validity values for the corresponding PCs, which may then be used in step 470 to update the PC weight parameters w(i) as described hereinbelow. Step 450 may further include updating a maximum number of iterations to be performed, $I_{max}$, as described hereinbelow, and also may include updating a number of iterations in the initial stage of the processing K, as described hereinbelow.

Next, the processing may proceed to verify in step 460 whether the maximum number of iterations has been reached, and if not, may proceed farther to step 470 wherein the PC weights w(i) may be updated in successful iterations based on the validity values computed in step 450. However in one preferred embodiment, the aforedescribed sequence of steps 415 to 450 is first repeated K times without performing any weight updates, wherein K≧1, to probe, and obtain model scores E(k) for, a suitably wide distribution of samples $S_f$; here K may be a pre-defined fraction of the maximum number of iterations $I_{max}$, e.g., 0.15*$I_{max}$, and by way of example may be greater than 10. Accordingly, this embodiment includes step 465 which verifies if the current iteration number has reached K, and if not, re-directs the processing directly back to step 415, excluding the weight-update step 470, to start a new iteration.

In each of these first K PC sampling steps, hereinafter referred to together as the initial sampling stage or the constant-weight sampling stage, the random sampling algorithm in step 415 is executed so that individual PCs are selected from the full PC set 170 with a generally constant probability from step to step, so that the effect of the initial sample choice on the process is advantageously suppressed. This initial sampling stage advantageously enables avoiding, or at least suppressing, the effect of initially not very reliable "successful" model estimates computed in first iterations upon selecting subsequent PC subsets, since most "successful" but unreliable samples are likely to occur at the beginning of the iterative process.

Once a suitably large number K of the samples is obtained as verified in step 465, subsequent iterations may update values of the PC weight parameters w(i) using information obtained at preceding iterations. According to an embodiment of the present invention, the weights w(i) are updated in each successful PC sampling step, i.e. at each iteration which produces a score value E(k) that is greater, or at least no less that any of the previously generated scores; the new values of the weight parameters w(i) are computed based on the IRME generated in the current successful PC sampling step, and in some embodiments, also based on IRMEs generated in preceding successful PC sampling steps. According to a preferred embodiment of the invention, the PC weights are not updated, i.e. left unchanged from a previous step, in each PC sampling step that generates the score value E(k) that is smaller than at least one of the score values E(k'), k'=1, . . . , k, computed in the previous (k−1) PC sampling steps.

Computation of PC Validities

In addition to being corrupted by noise, the full PC set 170, which is the input data to the IRM estimator 400, may also contain so called gross outliers. There are at least two different scenarios that can contribute to the presence of gross outliers. In the first scenario, a PC does not correspond to any single physical point in real space. This can occur when for example the image contains a repeated texture structure or has occlusions. In the other scenario, a point correspondence is real and thus conforms to a specific IRM, but not the one that is currently being estimated. This can occur, for example, when the scene contains more than one motion model, e.g., camera motion and object motion. The correlation values between two features can in some instances provide information about outliers that are caused by mismatches but not by the repeated textures and the disagreement with the current IRM estimate. To discern gross outliers, the sample model that is being tested should be taken into consideration when the validity of a point correspondence is estimated.

In one embodiment, the validity of an $i^{th}$ PC may be estimated as the probability $P_m(v_i)$ that the $i^{th}$ point correspondence $\{\tilde{x}_i^2, \tilde{x}_i^2\}$ is correctly matched at the $m^{th}$ independent successful sample by the generated estimate $F_m$. The value of $P_m(v_i)$ may be computed as follows:

$$P_m(v_i) = \begin{cases} P(v_i \mid \varepsilon_i(F_m)), & \text{inlier if } \|\varepsilon_i(F_m)\| < T_{thr} \\ 0, & \text{outlier if } \|\varepsilon_i(F_m)\| \geq T_{thr}. \end{cases} \quad (4)$$

In equation (4), $P(v_i|\epsilon_i(F_m))$ is a relative probability representing a likelihood of the ith point correspondence being correctly matched when the error $\epsilon_i(F_m)$ is observed. In an alternative embodiment, the outliers may also be assigned non-zero error-dependent probability values based on the likelihood $P(v_i|\epsilon_i(F_m))$.

In order to determine the probability value $P_m(v_i)$, one needs an algorithm to obtain the likelihood $P(v_i|\epsilon_i(F_m))$ from the error signal $\epsilon_i(F_m)$. In one possible representation, $$P(v_i|\epsilon_i(F_m))=1-P(0\leq\epsilon\leq\epsilon_i(F_m))). \quad (5)$$

Here, $P(0\leq\epsilon\leq\epsilon_i(F_m))$ is the probability of the observed error $\epsilon_i(F_m)$ lying in the interval $[0, \epsilon_i(F_m)]$. The larger the conditional probability $P(v_i|\epsilon_i(F_m))$ is, the more valid the correspondent pair will be. The justification for this formulation can be seen by noting that if a given correspondence i is associated with the hypothesis $F_m$, the error $\epsilon_i(F_m)$ will be small. With a small error $\epsilon_i(F_m)$, the length of the interval $[0, \epsilon_i(F_m)]$ is reduced. This makes the probability of the error being inside the interval very small. Consequently, the conditional probability $P(v_i|\epsilon_i(F_m))$ will be large. On the other hand, when the error is large, the length of the interval is also large. This causes a large probability of the error being inside the interval, thus making the conditional probability $P(v_i|\epsilon_i(F_m))$ small.

A practical question is how to model the probability $P(0\leq\epsilon\leq\epsilon_i(F_m))$. A straightforward solution is to employ an exponential probability distribution $$p(\epsilon) \propto e^{-\epsilon^2/(2\cdot\sigma_\epsilon^2)}, \quad (6)$$

with $\sigma_\epsilon$ being the standard deviation calculated from the overall set of errors. However, the evaluation of this formula may be time-consuming and the probability $P(0\leq\epsilon\leq\epsilon_i(F_m))$ is sensitive to the variation of the error $\epsilon_i(F_m)$. Instead, in one embodiment computed values of the PC errors $\epsilon i(Fm)$ are quantized into a finite number of intervals, or bins, with each interval having the same size. By way of example, in a particular implementation 100 bins with every bin being 0.3 pixels in size have been used; this was experimentally shown to converge. Errors outside this range, i.e. greater than 30 pixels in this example, are assigned to the last interval. Let $Q_l$, c be the middle value of the interval $(Q_l, Q_l+1)$. Then, the probability distribution $P(0\leq\epsilon\leq\epsilon_i(F_i))$ can be approximated as a histogram $$p(Q_l < \varepsilon \leq Q_{l+1}) = \frac{H(Q_l, Q_{l+1}) \times e^{-Q_{l,c}^2/(2\cdot\sigma_\varepsilon^2)}}{\sum_{l=0}^{B-1} H(Q_l, Q_{l+1}) \times e^{-Q_{l,c}^2/(2\cdot\sigma_\varepsilon^2)}}, \quad (7)$$

where $H(Q_l, Q_l+1)$ is the number of point correspondences having errors in the interval of $(Q_l, Q_l+1)$, and B is the number of bins. The summation in equation (7) provides the appropriate normalization.

Consequently, the probability $P(0\leq\epsilon\leq\epsilon_i(F_m))$ can be computed using the following expression:

$$P(0 \leq \varepsilon \leq \varepsilon_i(F_m)) = \sum_{l=0}^{L} p(Q_l < \varepsilon \leq Q_{l+1}), \quad (8)$$

with L being the bin number wherein the current error value $\epsilon_i(F_m)$ is quantized to, as determined by the condition $Q_L<\epsilon_i$ $(F_m) \leq Q_L + 1$. From equations (8), (7) and (5), the $i^{th}$ PC validity value may in this embodiment be computed as $$P(v_i \mid \varepsilon_i(F_m)) = 1 - \sum_{l=0}^{L} p(Q_l < \varepsilon \leq Q_{l+1}) \quad (9)$$

Figure 5:
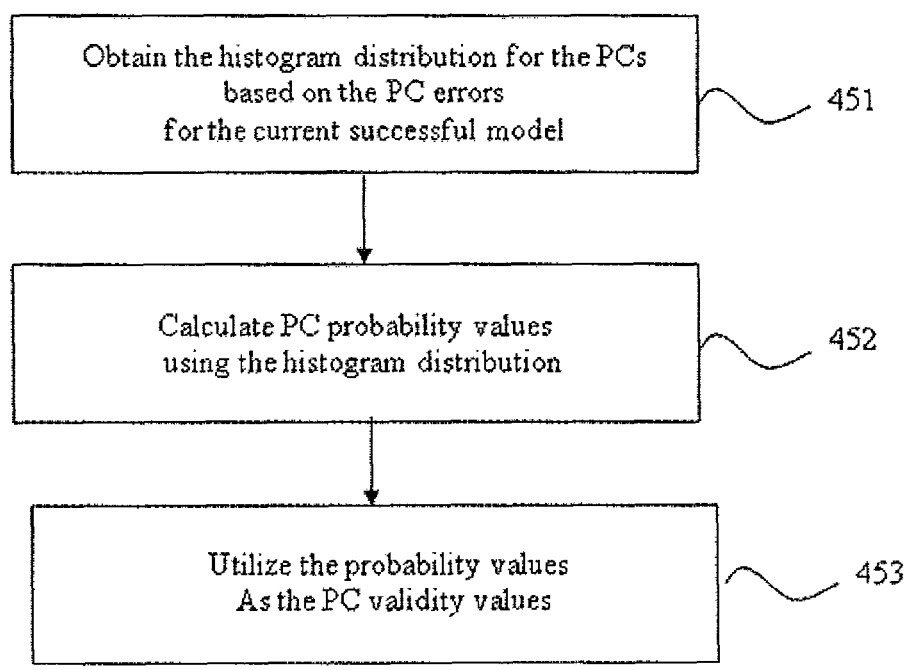
FIG. 5 is a schematic flowchart of the process for estimating validities of point correspondences according to an embodiment of the present invention.

Accordingly, in some embodiments of the invention step 450 may include computing by the processor 150 the probability values $P(v_i|\varepsilon_i(F_m))$ based on the error value $\varepsilon_i(F_m)$, which were obtained for said PC in step 425 of a current successful iteration (FIG. 4). One such embodiment is illustrated in FIG. 5, wherein step 450 is shown to include a sequence of steps 451-453, implementing the aforedescribed algorithm of computing PC probability values for a current sample model. In step 451, the processor 150 determines the histogram distribution of the PC errors $\varepsilon_i(F_m)$ for the current successful model $F_m$ according to equation (7), and then using this histogram distribution in step 452 to obtain the probability values for the PCs according to equation (9). In the shown embodiment, these probability values are then assumed to be the PC validity values, and are assigned to the corresponding PC weights w(i) in step 470, according to the equation $$w(i) = P(v_i|\varepsilon_i(F_m)), \quad (10)$$

The new PC weights w(i) are used in the next iteration to select a new PC subset $S_f$ in step 415.

In the embodiment described hereinabove, the PC weights w(i) used to guide the random sampling of the full PC set 170 in step 415 of a next iteration, are determined from information obtained from the latest successful sample m.

Figure 6:
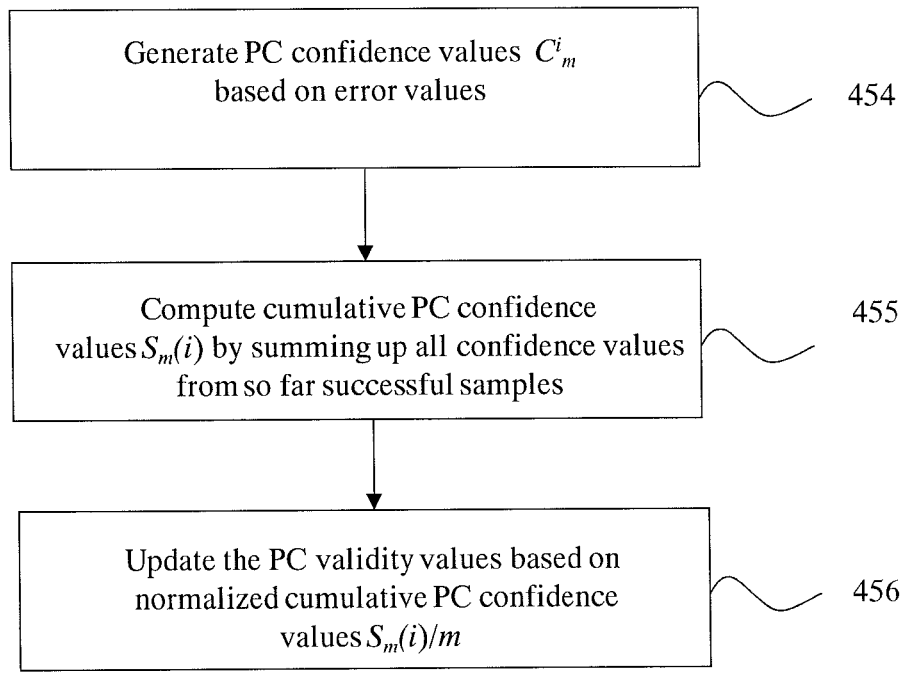
FIG. 6 is a schematic flowchart of the process for estimating validities of point correspondences by accumulating data for successful samples according to another embodiment of the present invention.

In other embodiments, information collected from a sequence of successful samples may be accumulated and used in subsequent iterations. Referring now to FIG. 6, in such embodiments step 450 of the method 400 of FIG. 4 may include obtaining, in step 454, a PC confidence value $C_m^i$ for at least some of the PCs based on the error values thereof $\varepsilon_i(F_m)$ for a current IRM estimate, and combining, in steps 455-456, said PC confidence values with PC confidence values obtained for respective PCs in one or more of previous PC sampling steps to generate the PC validity values, which are then used in step 470 of updating the current values of the PC weight parameters. In currently preferred implementations, only the successful iterations contribute into the updated weight factors. As illustrated in FIG. 6, the combining of the PC confidence values may include computing, in step 455, a cumulative PC confidence values $S_m(i)$ by summing up all confidence values from so far successful samples, according to $S_m(i) = C_1^i + C_2^i + \ldots + C_m^i$, and in step 456 updating the PC validity values based on normalized cumulative PC confidence values $S_m(i)/m$.

In one embodiment, step 454 of obtaining the PC confidence values comprises assigning each of the PCs one of: a same first confidence value $C_1$ if the error value thereof for the current candidate image relation model is less than the threshold value $T_{thr}$, and a same second confidence value $C_2$ if the error value thereof is greater than the threshold value $T_{thr}$:

$$C_m^i = \begin{cases} C_1, & \text{inlier} \quad \text{if} \|\varepsilon_i(F_m)\| < T_{thr} \\ C_2, & \text{outlier} \quad \text{if} \|\varepsilon_i(F_m)\| \geq T_{thr} \end{cases} \quad (11)$$

In one implementation that is referred to hereinafter as the LLN-RANSAC algorithm, $C_1 = 1$, and $C_2 = 0$, so that equation (11) takes the form of $$C_m^i = \begin{cases} 1, & \text{inlier} \quad \text{if} \|\varepsilon_i(F_m)\| < T_{thr} \\ 0, & \text{outlier} \quad \text{if} \|\varepsilon_i(F_m)\| \geq T_{thr} \end{cases} \quad (11a)$$

where $\varepsilon_i(F_m)$ is the error of the ith point corresponding pair with respect to the given fundamental matrix $F_m$. By way of example, if a current iteration is an m-th successful iterations, the validity value for an $i^{th}$ PC may be computed as follows:

$$P_{LLN}(v_i) = \frac{1}{m} \sum_{j=1}^{m} C_j^i \quad (12)$$

Here, $C_j^i$ is the confidence value generated by the processor using equation (11a) in jth successful iteration, $j \leq m$. According to the law of large numbers (LLN), this normalized sum should converge for large m to a value representing a probability of the $i^{th}$ PC being a valid point correspondence. The validity values $P_{LLN}(v_i)$ computed in accordance with equation (12) are then assigned in step 470 to the weight parameters w(i) of the corresponding PCs.

In one embodiment, the cumulative PC confidence values $S_m(i)$ for each PC are stored in memory 164, and at each successful iteration the processor updates these values in step 455 by adding thereto the confidence values computed in the current iteration for the corresponding PCs.

Figure 8:
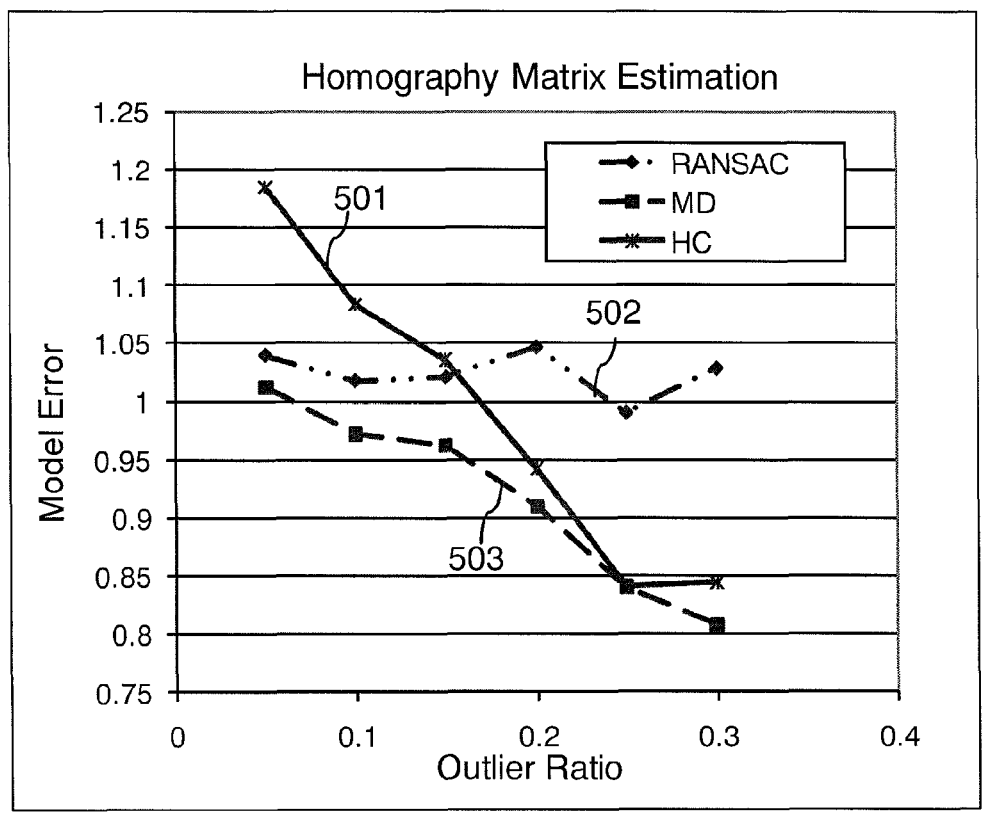
FIG. 8 is a graph illustrating the performance of one embodiment of the IRM generation method of the present invention in comparison with the prior art RANSAC and HC-RANSAC methods.
Figure 9:
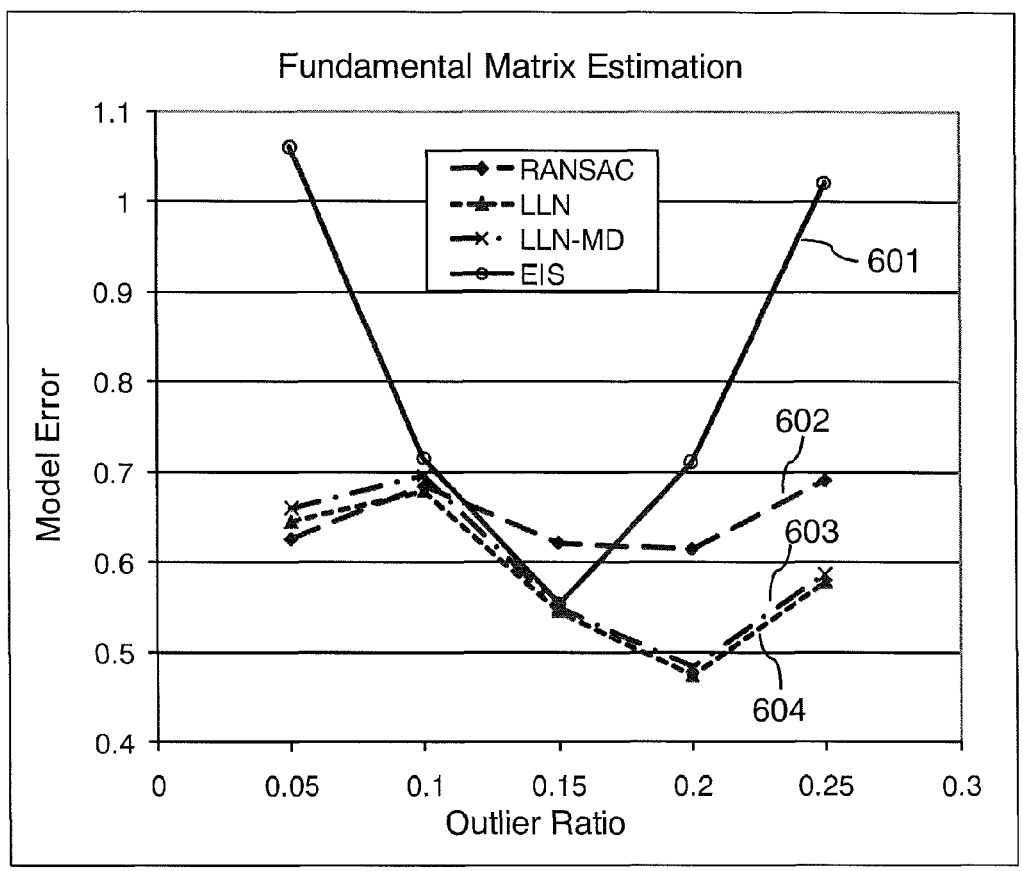
FIG. 9 is a graph illustrating the performance of two embodiments of the IRM generation method of the present invention utilizing cumulative PC confidence values in comparison with the prior art RANSAC and RANSAC-EIS-Metropolis methods.

We note that, although it is possible to compute the validity values by accumulating PC confidence values not only for successful IRM estimates but also for sample models with lower scores, and such embodiments are also within the scope of the present invention, we found that accounting only for successful models, i.e. models with currently best scores, may provide important advantages, as described hereinbelow with reference to FIGS. 8 and 9, showing simulation results described hereinbelow. Indeed, accounting for results obtained with inferior models in the computation of the PC validity values may lead to less reliable validity estimates for the PCs.

In one embodiment, the maximum number of iterations $I_{max}$ that are to be performed may be updated by the processor 150 in step 450 of each successful iteration. For that purpose, the processor may first execute instructions to estimate an expected fraction r of inliers in the full PC subset 170, which can be done for example by summing up all PC confidence values generated in the current successful iteration, for example by using the following equation (12a):

$$r = \frac{1}{n} \sum_{i=1}^{n} C_m^i \quad (12a)$$

The maximum number of iterations can then be adjusted according to the following equation (11b):

$$I_{max} = \frac{\log(1-p)}{\log(1-(1-r)^l)}. \quad (12b)$$

Here, p is the confidence level that at least one of the random samples of l correspondences is free from outliers, which can be a pre-defined parameter, with p=0.99 being a suitable choice.

FIG. 7 provides an exemplary algorithm of generating the output IRM 490 based on the full PC set 170 in the aforedescribed embodiment of the method of the present invention, referred to herein as the LLN-RANSAC algorithm. Note that lines 3 to 20 of the algorithm correspond to one iteration, i.e. one PC sampling step 401, of the method as shown in FIG. 4, while line 22 is executed in step 480 in the chart of FIG. 4 wherein the output IRM is generated. In the exemplary LLN-RANSAC approach illustrated in FIG. 7, the number K of initial constant-weight iterations is set as a pre-defined fraction of the maximum number of iterations, for example according to $K=0.15 \times I_{max}$, and is dynamically adjusted in each successful iteration as the Imax is adjusted, as indicated on line 14 of the LLN-RANSAC algorithm of FIG. 5. Line 15 of this algorithm is executed in step 465 of the chart of FIG. 4, causing the processor to initiate updating the PC weight parameters in successful iterations starting with the (K+1)th iteration.

In the LLN-RANSAC embodiment of FIG. 7, the output IRM is computed after all $I_{max}$ PC sampling steps are executed, based on the inlier set corresponding to a sample IRM having the highest score. For example, the processor 150 may, at each successful iteration during the execution of the method 400, save in memory 164 the current inlier set, i.e. the set of all PCs classified as inliers for the current successful model, as a current PC consensus set (PCCS). This PCCS is updated in each subsequent successful iteration, so that when all Imax iterations are executed, the saved PCCS corresponds to a highest-score sample IRM. In step 480, the processor may compute the output IRM 490 by regression as known in the art based on the plurality of all PCs from the final PCCS stored in memory, for example using the normalized eight-point algorithm as known in the art if the output IRM to be determined is in the form of the fundamental matrix.

It will be appreciated that there may be a number of way in which the output IRM 490 may be determined in step 480 based on information obtained in the PC sampling steps 401. For example, the method may simply provide the best-score sample IRM as the output IRM 490.

One attribute of the aforedescribed embodiment of the method that is based on equation (12), is that it assigns a same relatively large confidence value, such as 1, to all PCs that are classified as inliers for the current sample model, and a same relatively small confidence value, such as 0, to all PCs that are classified as outliers for the current sample model. However, in some embodiments it may be advantageous to have the PC confidence values $C_j^i$ for the inliers depend on the PC error values $\epsilon_i(F_m)$, so that for a two different inliers, a relatively greater PC error value results in a relatively smaller confidence value.

In one such embodiment, which is referred to hereinbelow as the LLN-MD algorithm, the PC probability values $P_m(v_i)$ obtained for successful sample models as described hereinabove with reference to equation (4) may be used, at least for the inliers, as the PC confidence values $C_m^i$:

$$C_m^i = P_m(v_i). \tag{13}$$

The PC validity values for successful sample model can then again be computed by combining, e.g. summing up, all of the previously computed confidence values in the current and preceding successful iterations, such as in accordance with equation (12). Denoting the validity values in this embodiment of the method 400 as $P_{LLN-MD}(i)$, they can be generated by the processor 150 according to the following equation (14):

$$P_{LLN-MD}(i) = \frac{1}{m} \sum_{j=1}^{m} P_j(v_i). \tag{14}$$

Here again $P_j(v_i)$ is the probability that the $i^{th}$ point correspondence is correctly matched at the $j^{th}$ independent successful iteration by the corresponding IRM estimate $F_j$; it can be computed by the processor 150 as described hereinabove with reference to FIG. 4 and equations (4)-(9).

The PC validity values $P_{LLN-MD}(i)$ are then assigned to the corresponding PC weights w(i) in step 470, according to the equation $$w(i) = P_{LLN-MD}(i). \tag{15}$$

The new PC weights w(i) are again used in the next iteration as the probabilities to select a new PC subset in step 415.

Simulation Results

The performance of some of the aforedescribed embodiments of the IRM generator 400 of the present invention was investigated in application to the problem of estimating the fundamental matrix F and the Homography matrix H, which provides another example of an IRM as known in the art. The ground truth point correspondences (PCs) were obtained by projecting randomly selected 3D object points onto the images obtained by two cameras. One camera was fixed at the origin, while the second camera was randomly rotated in the case of a Homography matrix and additionally translated in the case of a fundamental matrix. The intrinsic parameter values of both cameras were chosen as in P. H. S. Torr and D. W. Murray, "The development and comparison of robust methods for estimating the fundamental matrix," Int. J. Computer Vision, 24(3):271-300, 1997, incorporated herein by reference.

For each test, 200 ground truth PCs were automatically generated as described before and then corrupted by a zero-mean Gaussian noise with a predetermined noise variance $\sigma^2$ of 1 in the case of the fundamental matrix and 2 in the case of the Homography matrix. The Gaussian noise was added to the image point coordinates of all PCs. After that, a randomly selected subset of correspondences, to be considered as outliers in the test, was further corrupted by a uniform noise. The outlier noise was generated from a uniform distribution over a 512×512 square (image size). The uniform noise was added to the coordinates of the corresponding points in only one image of the corresponding image pair. In contrast, Gaussian noise was added to the coordinates in both images. To perform a reliable comparison, such a test was repeated 200 times for every given ratio of outlier ranging from 5% to 25%.

The aforedescribed embodiments of the IRM generator 400 of the present invention were compared to prior art models, namely: the standard RANSAC, HC-RANSAC and RANSAC-EIS-Metropolis estimators described hereinbelow. To evaluate the accuracy of the output IRMs provided by the respective methods, the model errors were computed as known in the art for the output IRMs with ground truth PCs, in the form of the Sampson error in the case of the Fundamental Matrix, and of an Algebraic error in the case of the Homography matrix H, as described for example in R. Hartley and A. Zisserman, Multiple View Gomerty in Computer Vision, Cambridge University Press, second edition, 2003.

Turning first to FIG. 8, there is shown the model error versus the number of outliers using the full ground truth PC set for the output IRMs, which are in this case in the form of the Homography matrices, for three different algorithms: standard RANSAC (curve 502); the MD-RANSAC embodiment of the method of the present invention as described with reference to FIG. 5; and the HC-RANSAC algorithm described in Pylvanainen, T., Fan, L.: "Hill climbing algorithm for random sampling consensus methods," ISVC 2007, Part I. LNCS, vol. 4841, pp. 672-681. Springer, Heidelberg (2007). In the HC-RANSAC method, the probability of selecting an inlier to the current model in a next sampling step is increased proportional to the number of inliers for the current model.

As can be clearly seen, the MD-RANSAC method of the present invention is superior, i.e. provides a more accurate IRM with a smaller model error, not only to the standard RANSAC algorithm, but also to the HC-RANSAC approach, especially when the number of outliers is relatively small, i.e. less than about 0.2 in this example. One possible reason for this is the absence of the initial "data accumulation" stage of the sampling in the HC approach, where for many initial iterations the selection probabilities, i.e. the weights, are not being updated. Another possible reason for the relatively higher error of the HC method is the coarse discrimination between the assigned validity values of the inliers and outliers during sampling, when all inliers are assigned the same high validity independent on the associated PC error.

FIG. 9 shows the model error versus the number of outliers using the full ground truth PC set for the output IRMs, which are in this case in the form of the Fundamental matrices, for four different algorithms: standard RANSAC (curve 602); the LLN-RANSAC embodiment of the method of the present invention as described with reference to FIG. 6 (curve 604); the LLN-MD algorithm of the present invention, and the RANSAC-EIS-Metropolis algorithm described in Lixin Fan and Timo Pylvanainen, "Robust Scale Estimation from Ensemble Inlier Sets for Random Sample Consensus Methods", in ECCV 2008, Part III, LNCS 5304, pp. 182-195, 2008, which is incorporated herein by reference. In the RANSAC-EIS-Metropolis algorithm, the data point weights, which guide the point data selection, are derived from statistics of repeated inlier points using so-called Ensemble Inlier Sets (EIS), which are accumulated from previously tried sample models including those with less-than-best scores. One apparent shortcoming of the EIS-metropolis method is that it calculates data point validities by accumulating inliers also for lower-score models, which are more likely to deviate from a "true" motion model to be found; accounting for them may give rise to less accurate validity estimates, which may in turn be disadvantageous for the method's efficiency and/or convergence. In another shortcoming, the EIS-metropolis similarly to the HC method, updates the weights without consideration of how likely it is that the current successful sample is close to a "true" sample. An unreliable successful sample obtained too earlier in the processing cycle will lead to an unreliable measure of the PC validity which may mislead the random selection of the minimal PC subset thereby reducing the accuracy of the final estimates.

Indeed, FIG. 9 demonstrates that the LLN-RANSAC and LLN-MD-RANSAC embodiments of the method of the present invention yield superior results with smaller model error as compared to both the standard RANSAC and the RANSAC-EIS-Metropolis algorithms. These results further illustrate the advantages of the delayed onset of the guided sampling according to the present invention, when a relatively large number of sample models is analyzed prior to the first update of the PC selection probabilities, and the advantages of excluding less-than-successful samples when accumulating PC confidence values for validity estimation. Contrary to the LLN-RANSAC and the LLN-MD-RANSAC embodiments of the present invention, the RANSAC-EIS-Metropolis algorithm adds the inlier sets with less-than-best score to measure the PC validities.

Further simulation results relating to the method of the present invention in different aspects thereof can be found in the following papers: Houman Rastgar, Liang Zhang, Demin Wang, Eric Dubois, Validation Of Correspondences In MLE-SAC Robust Estimation, ICPR 2008; Liang Zhang, Houman Rastgar, Demin Wang, André Vincent, Maximum Likelihood Estimation Sample Consensus with Validation of Individual Correspondences, $5^{th}$ International Symposium on Visual Computing, pp. 447-456, Nov. 30-Dec. 2 2009, Las Vegas, Nev., USA, both of which are incorporated herein by reference.

The present invention has been fully described in conjunction with the exemplary embodiments thereof with reference to the accompanying drawings. Of course numerous other embodiments may be envisioned without departing from the spirit and scope of the invention, and an ordinary person in the art would be able to construct such embodiments without undue experimentation in light of the present disclosure.

For example, although in the embodiments described hereinabove the method of the present invention has been mainly described as applied to the generation of the image relation model in the form of the fundamental matrix, it will be appreciated that the method equally applies to the generation of the image relation models in other forms, such as, but not limited to, the Homography motion model, as described for example in R. Hartley and A. Zisserman, Multiple View Geometry in Computer Vision, Cambridge University Press, second edition, 2003, the affine transform, etc. It will be appreciated that the method of the present invention, as described hereinabove in its various embodiments, is equally applicable in each of these cases, with possibly only minimal modifications which would be apparent to the skilled reader from the present specification. For example, the Homography motion model is defined by 8 independent parameters, and therefore require only 4 point correspondences, i.e. 4 corresponding pairs of non-collinear feature points, as the minimal PC set to be fully determined in step 425 of the method 400, using known in the art algorithms. The affine transform includes 6 free parameters, and therefore may be fully defined by a minimal set of 3 PCs, using known in the art methods.

Furthermore, it should be understood that each of the preceding embodiments of the present invention may utilize a portion of another embodiment.

Of course numerous other embodiments may be envisioned without departing from the spirit and scope of the invention.

We claim:

1. In a system comprising a processor and a memory for storing a plurality of point correspondences (PCs) between two images of a same scene or object obtained from one or more cameras, a method for determining an output image relation model relating the two images, comprising:
   a) using the processor to perform a series of PC sampling steps, each PC sampling step comprising:
   i) selecting a PC subset from the plurality of PCs utilizing a weighted random or pseudo-random selection algorithm wherein individual PCs are selected in dependence upon current values of weight parameters assigned thereto,
   ii) computing an image relation model estimate based on the PC subset, and
   iii) obtaining information related to an accuracy of the image relation model estimate for the plurality of PCs;

b) obtaining, with the processor, the output image relation model using the information related to the accuracy of the computed image relation model estimates; and, c) saving the output image relation model in a computer-readable memory for generating new images;

wherein the current values of the weight parameters assigned to the PCs remain constant in a first K PC sampling steps, so that same current values of the weight parameters are used for same PCs in selecting the PC subsets in the first K PC sampling steps, wherein K is an integer greater than 1, and wherein in at least one of the PC sampling steps following the first K PC sampling steps, the current values of the weight parameters are updated by the processor using the image relation model estimate computed in said at least one of the PC sampling steps.

2. The method of claim 1, wherein the image relation model estimates comprise at least one of a fundamental matrix, an essential matrix, a Homography matrix, and an affine transform.

3. The method of claim 1, wherein step iii) of obtaining information related to an accuracy of the image relation model estimate comprises:

iv) computing, for each of the plurality of PCs, a PC error value for the image relation model estimate generated in said PC sampling step; and, v) generating a score value for said image relation model estimate based on said PC error values for the plurality of PCs.

4. The method of claim 3, wherein the at least one of the PC sampling steps comprises:

computing a validity measure for each of the PCs based at least in part on the PC error value for said PC generated in the current PC sampling step, and updating the weight values of the PCs using said validity measures thereof prior to selecting a next PC subset.

5. The method of claim 4, wherein computing the validity measure for each of the PCs comprises computing a probability value based on the error value computed for said PC in a current PC sampling step, so that relatively greater error values correspond to relatively smaller probability values.

6. The method of claim 3, wherein the at least one of the PC sampling steps comprises a sequence of successful PC sampling steps each generating a score value that is equal or greater than any of the score values computed in the PC sampling steps preceding said successful PC sampling step.

7. The method of claim 3, wherein the at least one of the PC sampling steps comprises:

obtaining a PC confidence value for at least some of the PCs based on the error values thereof for a current image relation model estimate;

combining said PC confidence values with PC confidence values obtained for respective PCs in one or more of previous PC sampling steps to generate PC validity values; and, updating current values of the PC weight parameters using the PC validity values.

8. The method of claim 7, wherein the step of obtaining a PC confidence value comprises assigning each of the PCs one of: a same first confidence value if the error value thereof for the current image relation model estimate is less than a threshold value, and a same second confidence value if the error value thereof is greater than the threshold value.

9. The method of claim 7, wherein the first confidence value is one, and the second confidence value is zero.

10. The method of claim 7 wherein the step of obtaining a PC confidence value comprises computing a probability value based on the error value computed for said PC in a current PC sampling step and on a distribution of the error values computed for the plurality of PCs in the current PC sampling step, and using said probability value as the PC confidence value.

11. The method of claim 7 wherein non-zero PC confidence values are assigned only to the PCs having the error values for the current image relation model estimate no greater than a threshold value.

12. The method of claim 3, wherein the current values of the weight parameters are updated by the processor only in successful PC sampling steps, wherein a successful PC sampling step generates the score value that is equal or greater than any of the score values computed in the PC sampling steps preceding said successful PC sampling step, and wherein the current values of the weight parameters remain unchanged from a previous PC sampling step if the score value generated in a current PC sampling step is less than at least one of the previously generated score values.

13. The method of claim 3, wherein step b) comprises determining an inlier set of PCs having the error values less than a threshold value for the one of the image relation model estimates that has the best score, and computing the output image relation model based on the inlier set of PCs.

14. The method of claim 1, wherein in each PC sampling step, the current values of the weight parameters are updated only if the image relation model estimate computed in a current PC sampling step has an accuracy score that is at least not lower than the accuracy score of the image relation model estimate computed in each of the previous PC sampling steps.

15. The method of claim 1, wherein K is greater than 10.

16. In a system comprising a processor, a memory for storing images, said images comprising two images of a same scene or object obtained from one or more cameras, and further comprising a memory for storing a plurality of point correspondences (PCs) between the two images, a method for determining an output image relation model for the two images, comprising:

a) using the processor to perform a series of PC sampling steps, each PC sampling step comprising:

i) selecting a PC subset from the plurality of PCs utilizing a random or pseudo-random selection algorithm, wherein in at least some of the PC sampling steps individual PCs are selected from the plurality of PCs with a probability that depends on current values of weight parameters assigned to each of the PCs;

ii) computing an image relation model estimate for said PC subset;

iii) computing, for each of the plurality of PCs, a PC error value for the image relation model estimate generated in said PC sampling step, and generating a score value for said image relation model estimate based on said PC error values for the plurality of PCs; and, iv) computing PC confidence values based on the PC error values of corresponding PCs;

b) obtaining, with the processor, the output image relation model based on one of the image relation model estimates that has a best score value; and, c) saving the output image relation model in a computer-readable memory for generating new images;

wherein at least some of the PC sampling steps further comprise updating values of the weight parameters based on cumulative PC confidence values computed for a sequence of PC sampling steps.

17. The method of claim 16, wherein the step of updating values of the weight parameters comprises:
   obtaining a PC confidence value for at least some of the PCs based on the error values thereof for a current image relation model estimate;
   generating PC validity values by combining said PC confidence values with PC confidence values obtained for respective PCs in each of previous PC sampling steps having score values greater than any of the score values computed in preceding PC sampling steps; and,
   updating current values of the PC weight parameters using the PC validity values.

18. The method of claim 17, wherein step b) comprises determining an inlier set of PCs having the error values less than a threshold value for the one of the image relation model estimates that has the best score, and computing the output image relation model based on the inlier set of PCs.

19. The method of claim 16, wherein the values of the weight parameters are updated in PC sampling steps if the score value computed therein is no less than any of the score values computed in previous PC sampling steps, and are left unchanged from a previous step if said score value is smaller than at least one of the score values computed in the previous PC sampling steps.

20. In a system comprising a processor and a memory for storing a plurality of point correspondences (PCs) between two images of a same scene or object obtained from one or more cameras, a method for determining an output image relation model relating the two images, comprising:
   a) using the processor to perform a series of PC sampling steps, each PC sampling step comprising:
      i) selecting a PC subset from the plurality of PCs utilizing a weighted random or pseudo-random selection algorithm wherein individual PCs are selected in dependence upon current values of weight parameters assigned thereto,
      ii) computing an image relation model estimate based on the PC subset;
      iii) computing, for each of the plurality of PCs, a PC error value for the image relation model estimate generated in said PC sampling step; and,
      iv) generating a score value for said image relation model estimate based on said PC error values for the plurality of PCs;
   b) obtaining, with the processor, the output image relation model using information related to one of the image relation model estimate with a best score; and,
   c) saving the output image relation model in a computer-readable memory for generating new images;
   wherein at least one of the PC sampling steps comprises:
      computing, by the processor, PC probability values based on the error values computed for corresponding PCs in a current PC sampling step and on a distribution of the error values computed for the plurality of PCs in the current PC sampling step, and
      updating by the processor the current values of the weight parameters using the PC probability values computed in said at least one of the PC sampling steps.

* * * * *